Aug. 18, 1931.     G. F. JONES     1,819,559
METALLIC PACKING FOR RECIPROCATING SHAFTS
Filed Nov. 23, 1929
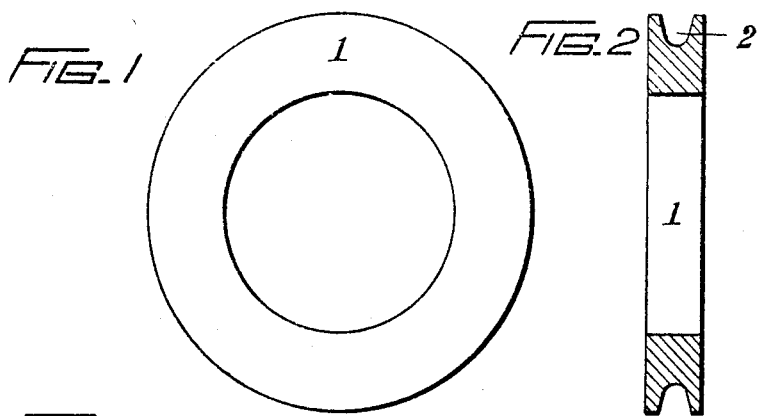
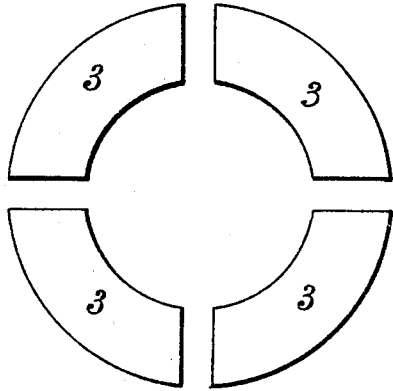
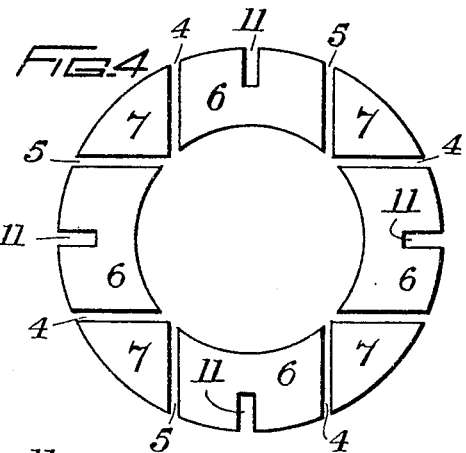
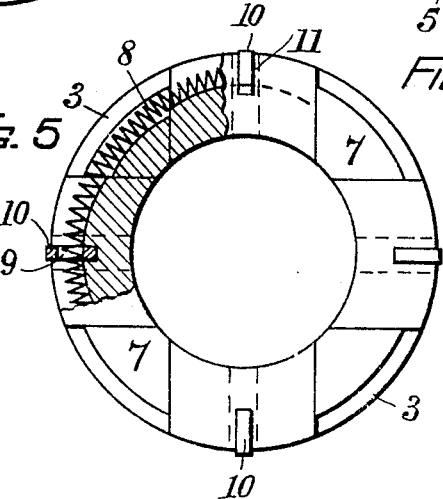
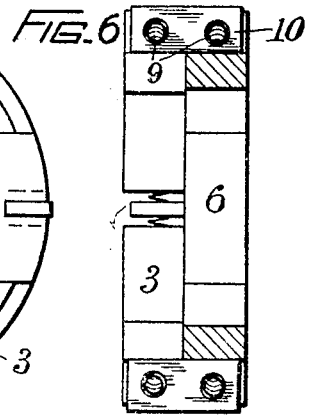
INVENTOR
G. F. JONES
ATTY.

Patented Aug. 18, 1931

1,819,559

UNITED STATES PATENT OFFICE

GEORGE FREDERICK JONES, OF WESTMINSTER, LONDON, ENGLAND, ASSIGNOR TO BRITISH METALLIC PACKINGS COMPANY (1929) LIMITED, A COMPANY OF GREAT BRITAIN

METALLIC PACKING FOR RECIPROCATING SHAFTS

Application filed November 23, 1929, Serial No. 409,322, and in Great Britain August 17, 1929.

This invention relates to a metallic packing of ring form more particularly designed for use with reciprocating shafts such as the piston rods of steam engines.

The principal object of the invention is to provide an improved construction of metallic packing comprising two ring members each divided into a plurality of segments and held together so as to form a unit which may be readily positioned on the shaft.

Another object of the invention is to provide a metallic packing which is relatively easy and inexpensive to manufacture and which functions with efficiency and durabilty even under adverse conditions of use.

The metallic packing according to the invention comprises the construction and combination of parts as pointed out in the appended claims and an example of which will be hereinafter described.

In the accompanying drawings

Fig. 1 is a face view of a preferred form of ring member,

Fig. 2 is a side sectional view of the said ring member,

Fig. 3 shows a ring member such as that in Figs. 1 and 2 divided radially into segments in accordance with the invention, Fig. 4 shows a like ring divided into segments along lines offset from the centre thereof.

Fig. 5 is a view showing the two divided rings placed together, part of the front ring being shown in section, and Fig. 6 is substantially a side sectional view of Fig. 5.

A ring member such as 1, Figs. 1 and 2, and with a peripheral groove 2 is divided radially as shown in Fig. 3 to produce segments 3 which are placed against a second ring member similar to 1 and which is divided at 4 and 5 along two pairs of parallel straight lines intersecting at right-angles and spaced apart by equal amounts from the centre of the second ring member, to form parallel-sided segments 6 and inwardly-tapered segments 7. The segments 7 are moved inwards radially to fill the gaps 4 and 5 and so that their outer edges are inwardly offset in relation to the outer edges of the other segments, their peaks being cut off by any suitable turning process as shown in Fig. 5. The ring members are encircled by springs 8 in the grooves 2 and passing through holes 9 in four radially arranged plate elemen s 10, one end of each of which lies, preferably tightly, in a slot 11 in a segment 6 whilst the other end of the plate lies in a slot in a segment 3 or in he gap between the segments 3 the latter construction being illustrated in the drawings. The plate elements thus form a means for holding the ring members together as a unit whereby they may be readily positioned on a shaft.

What I claim is:—

1. A metallic packing for reciprocating shafts, comprising a ring member divided into segments, a second ring member divided into segments along two pairs of parallel straight lines intersecting at right-angles and spaced apart by equal amounts from the centre of the second ring member, grooves in the outer peripheries of the ring members, and springs arranged in the grooves an encircling the ring members for holding the segments in place, said springs being received in radially arranged plate elements extending between the ring members for holding them together.

2. A metallic packing ring for reciprocating shafts comprising, in combination, a ring member divided radially into segments, a second ring member divided into parallel-sided segments and inwardly tapered segments having their outer edges inwardly offset in relation to the parallel-sided segments, grooves in the outer peripheries of the ring members, springs arranged in the grooves and encircling the ring members, and radially arranged plate elements extending between the ring members and apertured to receive the springs.

In testimony whereof I affix my signature.

GEORGE FREDERICK JONES.